United States Patent [19]

Kaufman

[11] 3,757,214
[45] Sept. 4, 1973

[54] PROGRAMMABLE MULTI-MODE PHASE SENSITIVE VOLTMETER

[75] Inventor: David L. Kaufman, Lexington, Mass.

[73] Assignee: Gordon Engineering Company, Wakefield, Mass.

[22] Filed: July 6, 1971

[21] Appl. No.: 160,002

[52] U.S. Cl. ............................................. 324/83 Q
[51] Int. Cl. ............................................ G01r 25/00
[58] Field of Search.............. 324/83 A, 83 D, 83 Q; 328/155

[56] References Cited
UNITED STATES PATENTS

| | | | |
|---|---|---|---|
| 2,934,756 | 4/1960 | Kalmus | 324/83 Q X |
| 3,475,626 | 10/1969 | Holzman et al. | 324/83 A |
| 3,633,117 | 1/1972 | Reilly | 324/83 Q |

Primary Examiner—Alfred E. Smith
Attorney—Gerald Altman et al.

[57] ABSTRACT

Phase sensitive measurements of the fundamental component of a test signal having a complex waveform is performed in two distinct modes of operation using an unshifted and shifted sine wave reference signal. In each mode, the component is examined with respect to either the in-phase or quadrature phase of the reference signal. In measuring the total value of the fundamental component of the test signal with respect to the in-phase shifted reference signal, the reference signal is shifted, in a variable phase shifter having two wideband multipliers, in such a manner that the in phase component of the reference signal is maximized and the quadrature component of the reference signal is minimized. The test signal is multiplied by the in-phase shifted reference signal. The resulting signal is a measure of the total value of only the fundamental component of the test signal.

11 Claims, 5 Drawing Figures

PROGRAMMABLE MULTI-MODE PHASE SENSITIVE VOLTMETER

BACKGROUND OF THE INVENTION

1. Field of the Invention

The present invention relates generally to measuring devices and, more particularly, is directed towards a programmable multiple mode phase sensitive voltmeter.

2. Description of the Prior Art

Electronic voltmeters vary widely in performance and frequency range, depending upon the circuitry employed. Various circuit configurations have been developed in order to minimize errors introduced in the voltage measurement as a result of the effects of harmonics when nonsinusoidal test signals are being examined. One type of circuit configuration which uses phase sensitive detectors suffers from the disadvantage that it is responsive to odd harmonics of the nonsinusoidal test signal which causes errors to be present in the voltage measurement. Another type, which obtains harmonic rejection from the use of matched filters in the input and reference channels, suffers from the disadvantage of limited frequency range.

SUMMARY OF THE INVENTION

An object of the present invention is to provide a programmable, multiple mode, phase sensitive voltmeter for measuring the fundamental component of a nonsinusoidal test signal with respect to a sinusoidal reference signal. The voltmeter performs in two distinct modes of operation using an unshifted and a shifted reference signal. In each mode, the test signal is measured with respect to the in-phase and quadrature phase of the reference signal. The reference signal is phase shifted in a variable phase shifter in such a manner that the component of the reference signal which is in phase with the test signal is maximized and the component of the reference signal which is in quadrature with the test signal is minimized. In measuring the total value of the fundamental component of the test signal with respect to the shifted, in phase reference signal, the test signal is fed to one input terminal of an analog multiplier and the shifted reference signal is applied to another input terminal of the analog multiplier. In the analog multiplier, the test signal is multiplied by the in-phase, shifted reference signal. In consequence, the signal at the output of the multiplier is the total value of only the fundamental component of the nonsinusoidal test signal.

Another object of the invention is to provide a voltage or current controllable phase shifter which is characterized by sine and cosine function generators, and a pair of wideband multipliers. The operation of the function generators are controlled by an error amplifier. The signal at the output of the sine function generator and the quadrature component of the reference signal in a selected quadrant are fed to one of the wideband multipliers, and the signal at the output of the cosine function generator and the in-phase component of the reference signal in the selected quadrant are applied to the other wideband multiplier. The signals at the output terminals of each wideband multiplier are added in a first summing network. The signal at the output of the first summing network and the in-phase component of the reference signal in the selected quadrant are added in a second summing network. The combination of sine and cosine function generators, wideband multipliers, and summing networks is such as to provide a continuous frequency insensitive, voltage controlled phase shifter.

The invention accordingly comprises the device possessing the construction, combination of elements, and arrangement of parts that are exemplified in the following detailed disclosure, the scope of which will be indicated in the appended claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE INVENTION

Figure 1:
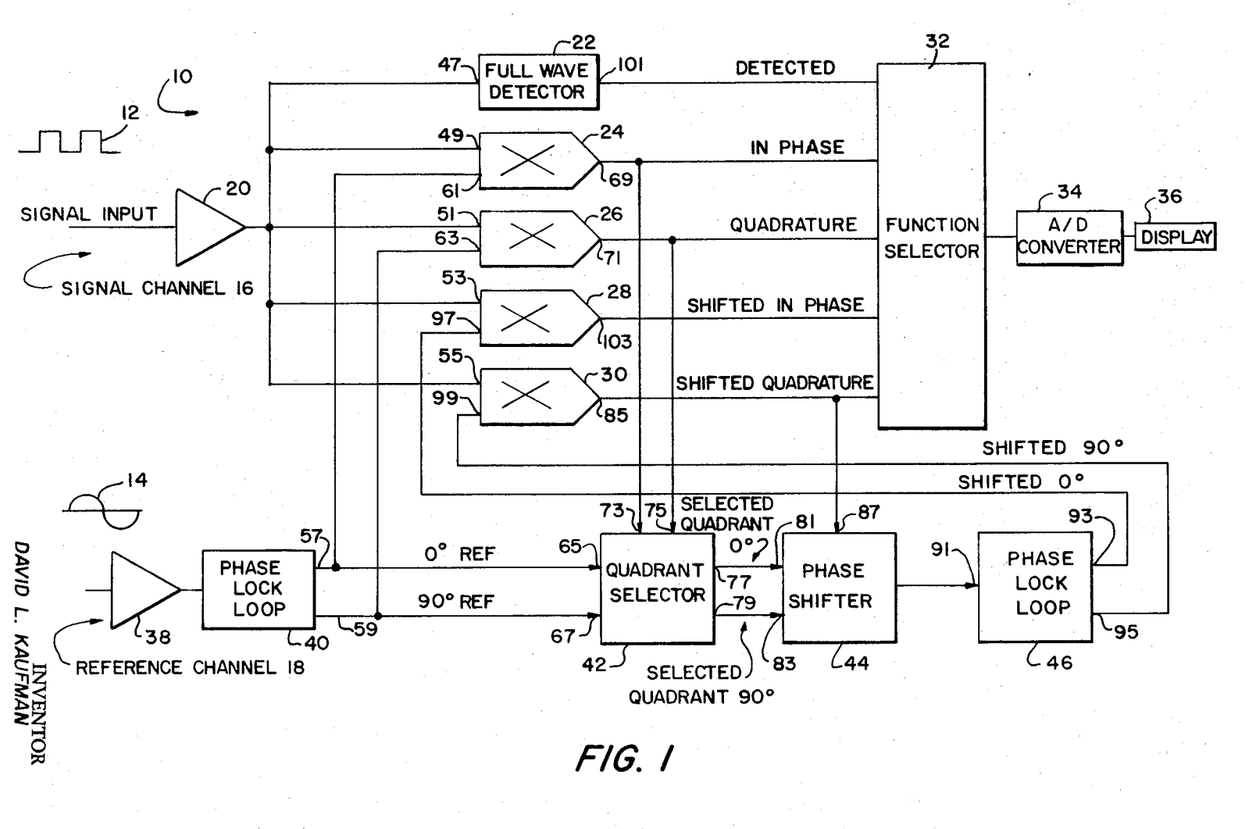
FIG. 1 is a schematic and block diagram of a phase sensitive voltmeter made according to the invention.

Referring now to the drawings, particularly FIG. 1, there is shown a multi-mode phase sensitive voltmeter 10 having a nonsinusoidal test signal 12 and a sinusoidal reference signal 14 applied to a signal channel 16 and a reference channel 18, respectively. Phase sensitive voltmeter 10 has two major modes of operation, phase-sensitive and non-phase-sensitive measurements. Phase sensitive corresponds to operation in any of the filtered or semi-filtered measurements including total voltage at the fundamental frequency. Non-phase-sensitive corresponds to unfiltered measurements of the total voltage.

In the non-phase-sensitive mode, which will be referred to herein as unfiltered for convenience, voltmeter 10 measures the full wave rectified average value of test signal 12 waveform including all frequency components from below 10 Hz to above 100 KHz, for example, and generates a digital code corresponding to the RMS value of a pure sine wave having the same average value. Input to reference channel 18, if any, is ignored in the unfiltered mode.

The phase-sensitive measurement is performed in two major distinct modes of operation using shifted or unshifted reference signal 14. In each of the two phase-sensitive modes, the component measured is either the in-phase or in quadrature phase with respect to the reference. That is, voltmeter 10 performs the following four basic phase-sensitive measurements:

a. In-phase component with unshifted reference
b. Quadrature component with unshifted reference
c. In-phase component with shifted reference
d. Quadrature component with shifted reference In the illustrated embodiment, the same hardware configuration except for the command decoding hardware is used for both the semi-filtered and filtered measurements. The main distinction, by way of example, between semi-filtered and fully filtered is that accuracy is permitted, by the specification to degrade from 1 to 2 percent below 2 Hz and above 20 KHz since this frequency coverage is specified to require fully filtered operation. Another distinction, by way of example, between semi-filtered and fully filtered is that the degradation in the 1 percent semi-filtered accuracy due to harmonic content in the signal is greater that that allowed in the fully filtered mode with its basic 2 percent accuracy. Both these differences relate only to the specifications and the measured signals, not to the actual hardware required to make the measurement. Measurement of the total voltage at the fundamental frequency and measurement of the in-phase component with shifted reference are similar with the exeption of the command decoding hardware.

Figure 2:
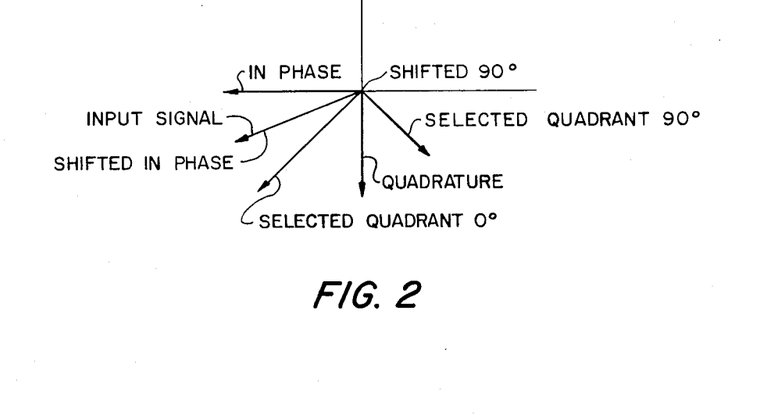
FIG. 2 is a graphical representation illustrating certain principles of the invention.

As shown in FIG. 1, phase-sensitive voltmeter 10 comprises signal channel 16 and reference channel 18. Signal channel 16 includes an amplifier 20; a full wave detector 22; detectors 24, 26, 28, and 30; a function selector 32; an analog to digital converter 34; and a display 36. Reference channel 18 includes an amplifier 38; a phase lock loop 40; a quadrant selector 42; a phase shifter 44; and a phase lock loop 46. Test signal 12 is fed through amplifier 20 to input terminals 47, 49, 51, 53, and 55 of detectors 22, 24, 26, 28, and 30, respectively. In the illustrated embodiment, detector 22 is a full wave detector and detectors 24, 26, 28, and 30 are analog multipliers. Reference signal 14 is applied to phase lock loop 40 via amplifier 38, the signals at output terminals 57 and 59 of phase lock loop 40 being a 0° reference and a 90° reference, respectively. The 0° reference is applied to another input terminal 61 of analog multiplier 24 and the 90° reference is applied to another input terminal 63 of analog multiplier 26. In addition, the 0° and 90° reference signals are applied to input terminals 65 and 67 of quadrant selector 42. The signal at an output terminal 69 of analog multiplier 24, which is the in-phase component of test signal 12 with respect to unshifted reference signal 18 and the signal at an output terminal 71 of analog multiplier 26, which is the quadrature component of test signal 12 with respect to unshifted reference signal 18, are applied respectively to input terminals 73 and 75 of quadrant selector 42. The signals at output terminals 77 and 79 of quadrant selector 42, selected quadrant 0° and selected quadrant 90°, respectively, are fed to their correlative input terminals 81 and 83 of phase shifter 44. The signal at an output terminal 85 of analog multiplier 30, which is the quadrant component of test signal 12 with respect to shifted reference 18 is applied also to an input terminal 87 of phase shifter 44. The signal at an output terminal 89 of phase shifter 44, which is the test signal the shifted in-phase reference signal, is applied to an input terminal 91 of phase lock loop 46. The signals at output terminals 93 and 95 of phase lock loop 46, shifted 0° and 90° reference signals, respectively, are applied to input terminals 97 and 99 of analog multiplier 28 and 30, respectively. A graphical representation of the unshifted 0° and 90° reference signals, the selected quadrant 0° and 90° signals, and the shifted 0° and 90° reference signals is illustrated in FIG. 2.

The detected signal at an output terminal 101 of full wave detector 22, the in-phase signal at output terminal 69 of analog multiplier 24, the quadrature signal at output terminal 71 of analog multiplier 26, the shifted in-phase signal at an output terminal 103 of analog multiplier 28, and the shifted quadrature signal at the output of analog multiplier 30 are applied to function selector 32, for example, a multi-pole switching device. Depending upon which measurement is desired, function selector 32 is so positioned that the signal which is applied to analog to digital converter 34 is the signal representing the desired measurement. The signal at the output of analog to digital converter 34, for example, a dual slope analog to digital converter, is applied to display 36 for presentation.

Figure 3:
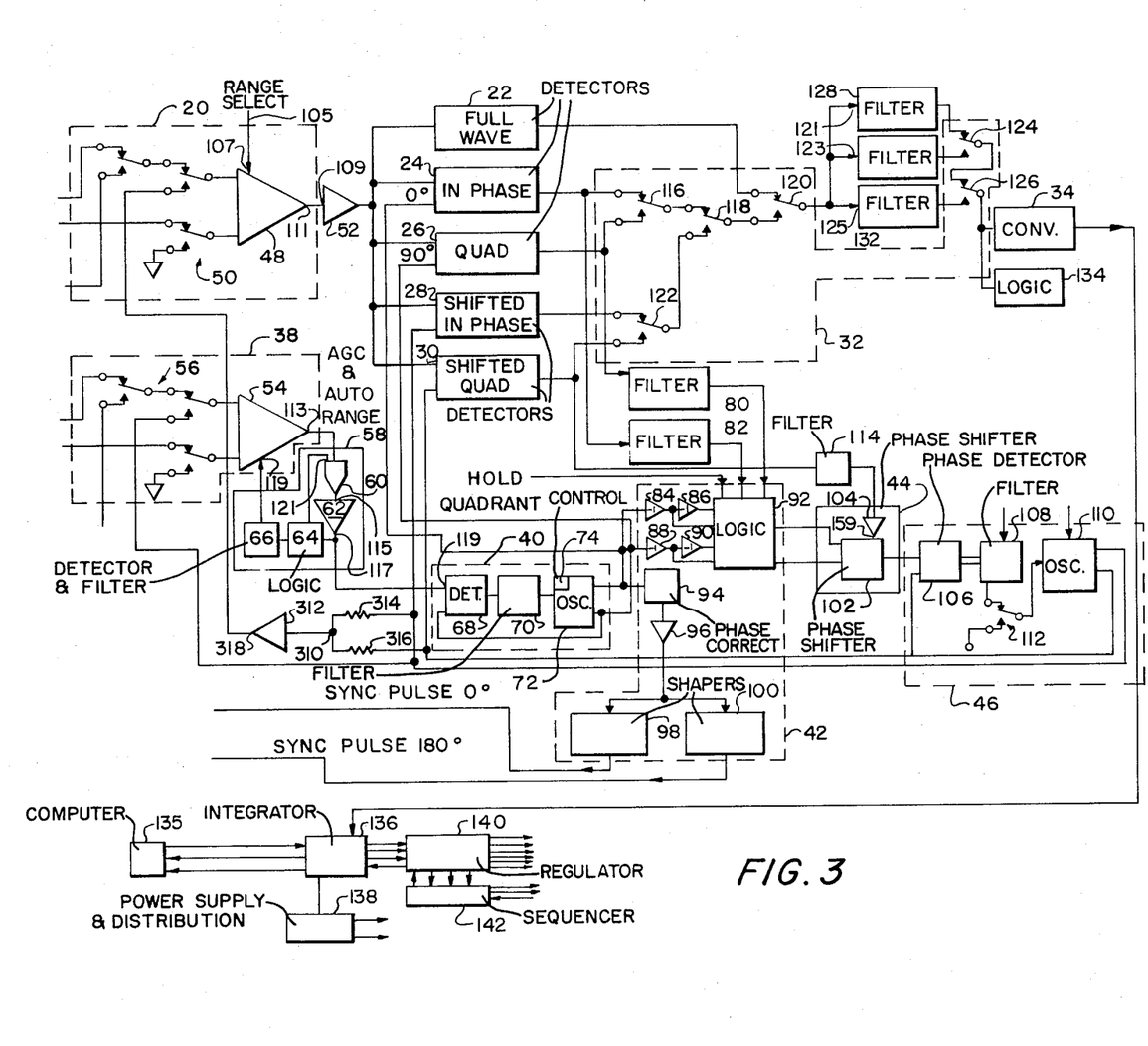
FIG. 3 is a detailed schematic diagram of FIG. 1.

Referring now to FIG. 3, it will be seen that amplifier 20 includes an input attenuator 48 and switching devices 50, for example, relays, for controlling the input test signals applied thereto. In the illustrated embodiment, a range select signal 105 is applied to a control terminal 107 of input attenuator 48 for controlling the voltage range of the signal applied to an input terminal 109 of a buffer amplifier 52. In the preferred embodiment, range select signal are digital signals. The signal at an output terminal 111 of attenuator 48 is standardized to 1 volt RMS (2.82 volts peak to peak) full scale. The signal at output terminal 111 of attenuator 48 is fed to buffer amplifier 52 which provides the gain required to drive detectors 22 through 30 to their full scale input value of 18 volts peak to peak, for example. Buffer amplifier 52 also includes filter elements (not shown) which control the high frequency roll off of signal channel 16 above 100 KHz and permit matching the high frequency phase response to that of the reference channel 18.

Reference channel amplifier 38 includes an attenuator 54 and switching devices 56, for example relays, for controlling the input reference signal applied thereto. The range of the signal at an output terminal 113 of attenuator 54 is controlled by an automatic gain control and auto-range circuit 58 which includes an analog multiplier 60, an automatic gain control 62, an amplifier detector and filter 64, and an auto-range logic 66. The signal at the output terminal 113 of attenuator 54 is fed to an input terminal 115 of automatic gain control 62 via analog multiplier 60. The signal at an output terminal 117 of automatic gain control 62 is applied to a control terminal 119 of attenuator 54 via amplifier detector and filter 64 and auto-range logic 66. Amplifier detector and filter 64 also generates a signal which is applied to an input terminal 121 of analog multiplier 60. In the illustrated embodiment, by way of example, automatic gain control 62 stabilizes the average signal level at 18 volts peak to peak for 10 to 1 input amplitude fluctuations. When the automatic gain control voltage reaches a limit, the signal applied to control terminal 119 from auto-range logic 66 is such that the amplitude of the signal at output terminal 113 of attenuator 54 is driven in the direction required to restore the amplitude of the signal at input terminal 115 of automatic gain control 62 to a usable value. Once a measurement has been initiated and the correct range has been selected, auto-range logic 66 is inhibited, whereby the selected range is maintained until the measurement is completed. Small amplitude fluctuations in reference signal 14 during the remainder of the measurement cycle are corrected dynamically by the automatic gain control circuit. Automatic gain control amplifier 62 also contains filter elements (not shown) to control the high frequency the roll of of reference channel 18 above 100 KHz and match its phase response to signal channel 16. Output terminal 117 of automatic gain control 62 is connected to a reference input terminal 119 of a phase detector 68 in phase lock loop 40.

Phase lock loop 40 includes phase detector 68, an active loop filter 70, and a quadrature oscillator 72. Phase lock loop 40 generates two stable amplitude sine wave signals, 0° reference and 90° reference, which are required to drive in-phase and quadrature detectors 24 and 26, respectively. In order to minimize the effects of temperature on the phase offsets of detector 68, it is preferred that phase detector 68 is located in an oven assembly. Active loop filter 70 uses a combination of an integrating type loop filter with a sample and hold final stage and provides a very high gain at DC with low ripple at its output. Voltage control oscillator 72 includes an amplitude control section 74 which compares the two phase lock loop 40 output signals against a precise DC voltage derived from analog to digital converter 34 and adjusts the damping of the oscillator to hold the amplitudes at its output to 18 volts peak to peak in spite of changes in frequency.

As hereinbefore noted, the signal from amplifier 52 and the 0° reference signal at output terminal 57 of phase lock loop 40 are applied to their respective input terminals of phase detector 24. In consequence, detector 24 generates a DC output signal proportional to the input amplitude and cosine of the relative phase angle. The signal from amplifier 52 and the 90° reference at output terminal 59 of phase lock loop 40 are applied to their respective terminals of quadrature detector 26 which generates a DC output signal proportional to the input amplitude and the cosine of the relative phase angle. The signals at the output terminals of detectors 24 and 26 drive 1 Hz active filters 80 and 82, respectively. Each active filter 80 and 82 operates to remove all ripple from the signal and generates quadrant information to quadrant selector 42.

Quadrant selector 42 comprises amplifiers 84, 86, 88, and 90; quadrant selection logic 92; a low frequency phase correction network 94; a comparator 96; a positive zero crossing and pulse shaper 98; and a negative zero crossing and pulse shaper 100. Quadrant selector 42 performs two major functions of generation of a sync pulse and selection of the nearest quadrant to the desired shifted reference phase. The AC component of the 0° reference signal has its crossings at the desired leading edge 10 percent points of the sync pulses except for a slight phase shift at very low frequencies due to the AC coupling networks. Low frequency phase correction network 94 cancels this phase shift and nulls out the DC component before the signal is sliced and amplified into a square wave output with transitions at 0° and 180° points. The positive transition drives positive zero crossing and pulse shaper 98 which generates a 0° sync pulse and the negative transition drives negative zero crossing and pulse shaper 100 which generates a 180° sync pulse. Quadrant selection logic 92 takes the filtered outputs of unshifted detectors 24 and 26, and by sensing the relative polarity and which of the four available phase signals (0°, 90°, 180°, or 270°) should be mixed together to drive phase shifter 44. For example, since mixing 0° and 90° equally provides a phase angle of 45° while mixing 90° and 180° yields 135° which is in quadrature with the 45° phase angle. The signal at the output terminals of quadrant selection logic 92, which is the selected quadrant 0° reference and the selected quadrant 90° reference is applied to phase shifter 44.

Phase shifter 44 comprises a variable phase shifter 102 and an error amplifier 104. Phase shifter 44 generates a shifted reference to phase lock loop 46 which is adjusted in-phase using the filtered output of shifted quadrature detector 30 until the detector output is nulled. Variable phase shifter 102 has a phase range of plus or minus 90° relative to the phase of the selected quadrant reference signal. This provides enough overlap to insure a null inspite of any phase inaccuracy in the quadrant selector since only plus or minus 45° would be required if they were exact. The shifted reference signal at the output of phase shifter 44 is applied to phase lock loop 46.

Phase lock loop 46 comprises a phase detector 106, an active loop filter 108, a quadrature oscillator 110, and an auto-test switch 112. Phase lock loop 46 generates two stable amplitude sine wave signals, the shifted 0° signal and the shifted 90° signal, which are supplied to shifted in-phase detector 28 and shifted quadrature detector 30, respectively. The operation of phase lock loop 46 is similar to the operation of phase lock loop 40 with the exception of auto-test switch 112. When phase lock loop 46 is de-addressed, auto-test switch 112 connects the control voltage applied to quadrature oscillator 110 to its nominal center band voltage so that it will run free at the center band frequency of the most recently programmed band. The shifted 0° signal at the output of phase lock loop 46 is applied to attenuator 54 through relays 56 and is fed to an input terminal 310 of an amplifier 312 via a resistor 314. The shifted 90° signal at the output of phase lock loop 46 is fed to input terminal 310 via a resistor 316. The signal at an output terminal 318 of amplifier 312 is applied to attenuator 48 via relays 50. The shifted 0° signal at the output of phase lock loop 46 and the signal at the output of amplifier 52 are applied also to shifted in-phase detector 28, and the shifted 90° signal at the output of phase lock loop 46 and the signal at the output of amplifier 52 are applied to shifted quadrature detector 30. The signal at the output of shifted quadrature detector 30 is applied to error amplifier 104 via a 1 Hz filter 114. In addition, detectors 28 and 30 generate a DC output signal proportional to the input amplitude and the cosine of the relative phase angle, the DC output signal being applied to function selector 32.

Function selector 32 comprises a plurality of switching devices 116, 118, 120, 122, 124, and 126, for example field effect transistor switches, which connect the desired detector output to the input terminals 121, 123, and 125 of post detection filters 128, 130, and 132, respectively. In the illustrated embodiment, by way of example, filter 128, 130, and 132 are 22.5 Hz cutoff, 7.5 Hz cutoff, and 1 Hz cutoff filters, respectively. Each filter is effectively half the band width of the input pass band for phase sensitive measurements. For unfiltered measurements, the filter used has a cutoff frequency less than 0.25 times the lowest frequency component presented at the input. Function selector switch 32 connects the programmed filter to analog to digital converter 34 and an auto-test limit comparator and logic unit 134. In the preferred embodiment, analog to digital converter 34 is a dual slope converter having analog and digital sections. The analog section includes reference voltage sources and a dual slope integrator. The digital section includes a digital register, a clock oscillator, and control logic.

In operation of the system, input signals from a computer 135 are applied to a computer interface 136 which controls a power supply and distribution system 138. Signal generated by computer interface 136 are applied to a command decoder register 140 which is further connected to a measurement sequencer 142.

Figure 4:
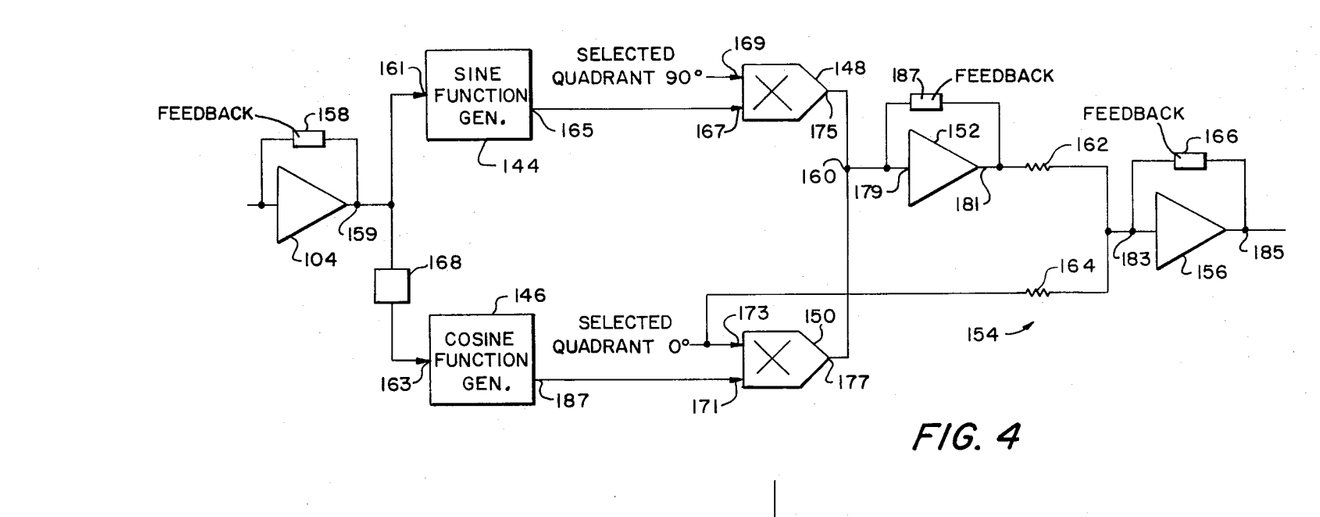
FIG. 4 is a schematic and block diagram of the phase shifter of FIG. 2.

Referring now to FIG. 4, there is shown a detailed block diagram of phase shifter 44. Phase shifter 44 comprises a sine function generator 144, a cosine function generator 146, analog multipliers 148 and 150, a buffer amplifier 152, a summing network 154, and an amplifier 156. The signal at the output terminal of shifted quadrature detector 30 is applied to error amplifier 104 having a feedback element 158. The signal at an output terminal 159 of amplifier 104 is applied to an input terminal 161 of function generator 144 and is applied to an input terminal 163 of cosine function generator 146 through an absolute value circuit 168, respectively. The signal at an output terminal 165 of sine function generator 144 and the selected quadrant 90° signal from quadrant selector 42 are applied to input terminals 167 and 169, respectively of analog multiplier 148, which adds in the amplitude of the selected quadrant 90° signal. The signal at an output terminal 187 of cosine signal generator 146 and the selected quadrant 0° signal from quadrant selector 42 are applied to their respective input terminals 171 and 173 of analog multiplier 150, which decreases the amplitude of the in-phase component. The signals at an output terminal 175 of analog multipliers 148 and at an output terminal 177 of analog multiplier 150 are summed at 160 and are applied to an input terminal 179 of buffer amplifier 152, which is provided with a feedback loop 187. The signal at an output terminal 181 of buffer amplifier 152 and the selected quadrant 0° signal are fed through impedances 162 and 164, respectively of summing network 154. Summing network 154 is further connected to an input terminal 183 of amplifier 156 having a feedback circuit 166. The signal at an output terminal 185 of amplifier 156 is applied to phase lock loop 46. The circuit details of error amplifier 104 and phase shifter 44 are shown in FIG. 5.

Figure 5:
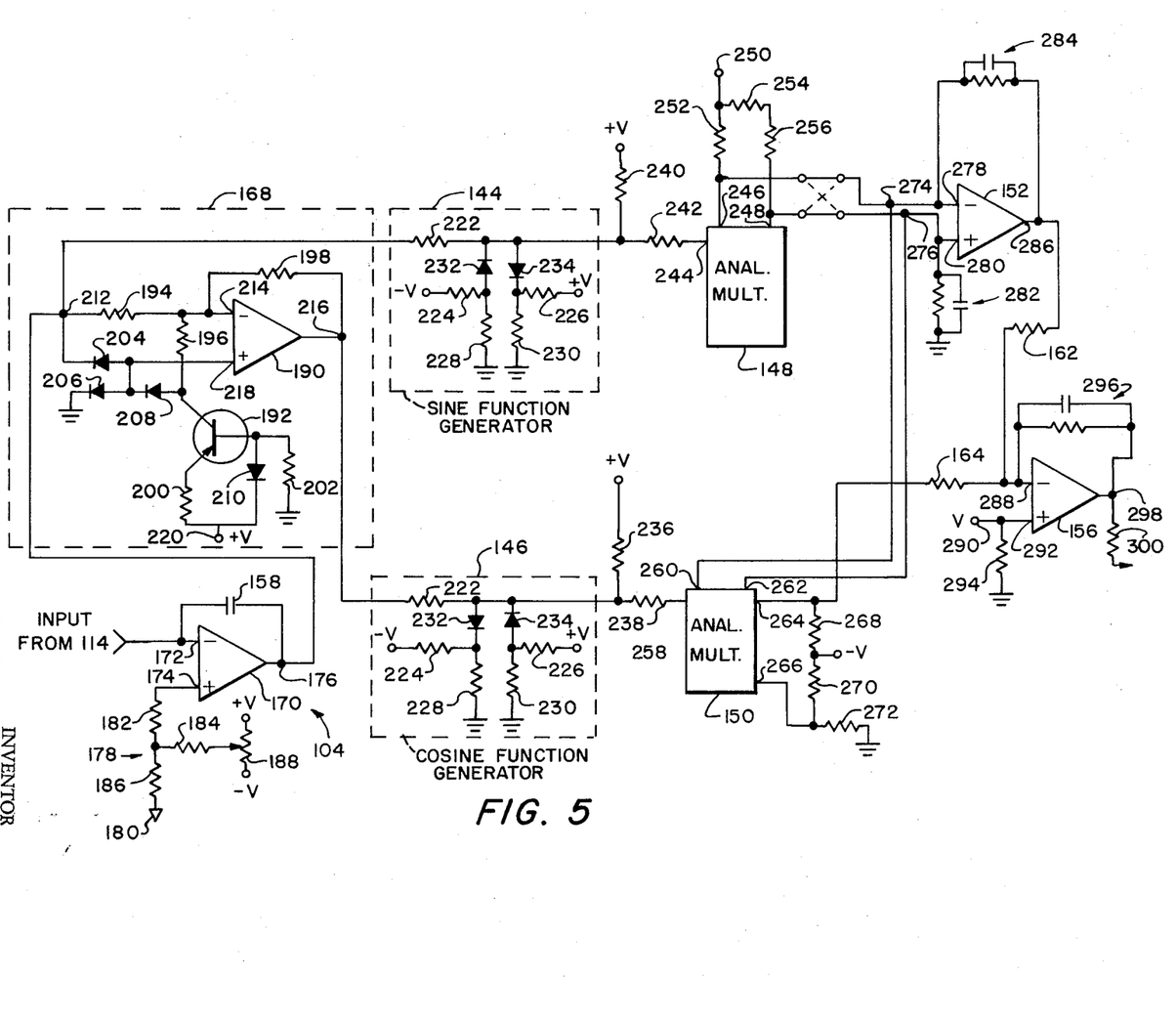
FIG. 5 is a detailed schematic diagram of FIG. 3.

Referring now to FIG. 5, it will be seen that error amplifier 104 comprises an operational amplifier 170 having input terminals 172 and 174, operational amplifier 170 being connected as an integrator, i.e., feedback element 158 being a capacitor connected between an output terminal 176 and input terminal 172. A voltage divider network 178, which includes fixed resistors 182, 184, and 186, and a variable resistor 188, is connected between terminal 174 and a signal ground 180. The signal as at output terminal 176 is applied to absolute value circuit 168.

Absolute value circuit 168 comprises an amplifier 190; a transistor 192; resistors 194, 196, 198, 200, and 202; and diodes 204, 206, 208, and 210. Output terminal 176 of operational amplifier 170 is connected to a junction 212 of one side of resistor 194 and the cathode of diode 204. The other side of resistor 194 is connected to one side of resistors 196, 198 and an input terminal 214 of amplifier 190. The other side of resistor 198 is connected to an output terminal 216 of amplifier 190. The anode of diode 204 is connected to the anode and cathode of diodes 206 and 208, respectively, and an input terminal 218 of amplifier 190. The cathode of diode 206 is connected to ground and the anode of diode 208 is connected to the other side of resistor 196 and the collector of transistor 192. Diode 210 is connected between the base of transistor 192 and a terminal 220 having a voltage +V applied thereto. Resistor 200 is connected between the emitter of transistor 192 and terminal 220. Resistor 202 is connected serially between ground and the junction of the base of transistor 192 and the anode of diode 210. Junction 212 is connected to sine function generator 144 and terminal 216 is connected to cosine function generator 196.

Sine function generator 194 comprises resistors 222, 224, 226, 228, and 230, and diodes 232 and 234. One side of resistor 222 is connected to junction 212 and the other side of resistor 212 is connected to the cathode and anode of doides 232 and 234, respectively. The anode of diode 232 is connected to the junction of one side of resistors 224, 228. The other side of each resistors 224 and 228 is connected to a voltage −V and ground, respectively. The cathode of diode 234 is connected to one side of resistors 226 and 230. The other side of resistors 226 and 230 are connected to voltage +V and ground, respectively. Cosine function generator 146 is identical to sine function generator 144. Accordingly, like components will be given like designations, the components being distinguishable by prime characters.

One side of resistor 222' is connected to junction 216 and the other side of resistors 222' is connected to the junction of a resistor 236 and a resistor 238. The anode of diode 234 is connected to the junction of resistors 240 and 242. The free end of resistors 236 and 240 are connected to voltage +V. The free end of each resistors 238 and 242 are connected to analog multipliers 150 and 148, respectively.

Analog multiplier 148 is shown as having input terminal 244 and differential output terminals 246 and 248. A terminal 250, having voltage +V applied thereto, is connected to terminal 246 via a resistor 252 and is connected to terminal 248 via resistors 254 and 256. Analog multiplier 160 is shown as having an input terminal 258; differential output terminals 260 and 262; an output terminal 264; and a control terminal 266. Resistors 268 and 270 are serially connected betwen terminals 264 and 266. Voltage −V is applied to the junction of resistors 268 and 270. The junction of resistor 270 and terminal 266 are connected to ground through a resistor 272. Terminal 246 is connected to terminal 260 at a junction 274 and terminal 248 is connected to terminal 262 at a junction 276, junction 274 and 276 being further connected to their respective input terminals 278 and 280 of amplifier 152.

A parallel RC circuit 282 is connected serially between input terminal 280 of amplifier 152. Feedback circuit 187, for example a ground parallel RC circuit 284 is connected serially between input terminal 278 and output terminal 286 of amplifier 152. Output terminal 286 is connected to terminal 288 through resistor 162 and output terminal 264 of analog multiplier 150 is connected to an input terminal 288 of amplifier 156 through resistor 164. A terminal 290, having either plus or minus voltage V applied thereto, is connected to an input terminal 292 of amplifier 156, a resistor 294 being connected between terminal 292 and ground. Feedback loop 166, for example, a parallel RC circuit 296 is connected serially between terminal 288 and an output terminal 298 of amplifier 156. Output terminal 298 is further connected to phase detector 196 through a resistor 300.

From the foregoing description, it will be realized that phase shifter 44 is a voltage or current controllable phase shifter which operates over a wide frequency range without tuning.

Since certain changes may be made in the foregoing disclosure without departing from the scope of the in-

What is claimed is:

1. A phase sensitive voltmeter comprising:
   a. first channel means for receiving a test signal;
   b. second channel means for receiving a reference signal;
   c. means operatively connected to said first and second channel means for phase shifting said reference signal with respect to said test signal;
   d. detecting means operatively connected to said phase shifting means and said first and second channel means for generating signals representing test signal measurements; and
   e. quadrant selector means operatively connected to said second channel means, detecting means, and phase shifter means for selecting the quadrant nearest said shifted reference signal.

2. The phase sensitive voltmeter as claimed in claim 1 including:
   a. first phase lock loop means operatively connected to said second channel means, quadrant selector means, and means for generating at least two unshifted signal in quadrature phase with respect to each other; and
   b. second phase lock loop means operatively connected to said phase shifter means and detecting means for generating at least two shifted signals in quadrature phase with respect to each other.

3. The phase sensitive voltmeter as claimed in claim 2 wherein said phase shifter means includes:
   a. sine function generator means operatively connected to said detecting means;
   b. cosine function generator means operatively connected to said detecting means;
   c. first analog multiplier means operatively connected to said sine function generator means and said second phase lock loop means, said first analog multiplier means of said shifted signals from said second phase lock loop means;
   d. second analog multiplier means operatively connected to said cosine function generator means and said second phase lock loop means, said second analog multiplier means of said shifted signals from said second phase lock loop means;
   e. first summing means operatively connected to said first and second analog multiplier means for adding the signal at the output of each said analog multiplier means; and
   f. second summing means operatively connected tr said first summing means and said second phase lock loop means, said second summing means operating to add the signal at said first summing means and said other shifted signal from said second phase shifter means;
   g. said phase shifting means operating over a wide frequency range without tuning.

4. A phase sensitive voltmeter comprising:
   a. first channel means for receiving a test signal;
   b. second channel means for receiving a reference signal;
   c. means operatively connected to said first and second channel means for phase shifting said reference signal with respect to said test signal; and
   d. detecting means operatively connected to said phase shifting means and said first and second channel means for generating signals representing test signal measurements, said detecting means including at least one analog multiplier.

5. A phase sensitive voltmeter comprising:
   a. first channel means for receiving a test signal;
   b. second channel means for receiving a reference signal;
   c. means operatively connected to said first and second channel means for phase shifting said reference signal with respect to said test signal; and
   d. detecting means operatively connected to said phase shifting means and said first and second channel means for generating signals representing test signal measurements, said detecting means including full wave detector means and at least four analog multiplier means.

6. The phase sensitive voltmeter as claimed in claim 5 including function selector means having input and output terminal means, said input terminal means operatively connected to said full wave detector means and analog multiplier means for selectively controlling the measured test signal presented at said output terminal means.

7. A phase sensitive voltmeter comprising:
   a. first channel means for receiving a test signal having a complex waveform;
   b. second channel means for receiving a sinusoidal reference signal;
   c. first phase lock loop means operatively connected to said second channel means for generating at least two unshifted signals in quadrature phase with respect to each other;
   d. detecting means having input and output terminal means said input terminal means operatively connected to said first phase lock loop means and said first channel means, said detecting means generating signals representing test signal measurements with respect to said reference signal said test signal measurements presented at said output terminal means;
   e. quadrant selector means operatively connected to said first phase lock loop means and said output terminal means of said detecting means;
   f. phase shifter means operatively connected to said quadrant selector means first and detecting means for phase shifting said reference signal with respect to said test signal; and
   g. second phase lock loop means operatively connected to said phase shifter means and said input terminal means of said detecting means, said second phase lock loop means generating at least two shifted signals in quadrature with respect to eachother;
   h. said quadrant selector means selecting the quadrant nearest said shifted reference signal.

8. The phase sensitive voltmeter as claimed in claim 7 including a function selector means having input and output terminal means, said input terminal means of said function selector means operatively connected to said detecting means for selectively controlling the measured test signal presented at said output terminal of said function selector means.

9. The phase sensitive voltmeter as claimed in claim 7 wherein said detecting means includes at least first, second, third, and fourth analog multiplier means, each said analog multiplier means having first and second input terminal means and an output terminal means, said first input terminal means of each said analog multiplier means operatively connected to said first channel means, said second input terminal means of said first and second analog multiplier means operatively connected to said first phase lock loop means, said second input terminal means of said third and fourth analog multiplier means operatively connected to said second phase lock loop means, said output terminal means of said first and second analog multiplier means operatively connected to said quadrant selector means, said output terminal means of said fourth analog multiplier means operatively connected to said phase shifter means, phase sensitive test signal measurements being presented at said output terminal means of each said analog multiplier means, said phase sensitive test signal measurement presented at said output terminal means of said first analog multiplier means being an in-phase test signal component with respect to said unshifted reference signal, said phase sensitive test signal measurement presented at said output terminal means of said second analog multiplier means being a quadrature phase test signal component with respect to said unshifted reference signal, said phase sensitive test signal measurement presented at said output terminal means of said third analog multiplier means being an in-phase test signal component with respect to said shifted reference signal, and said phase sensitive test signal measurement presented at said output terminal means of said fourth analog multiplier means being a quadrature phase test signal component with respect to said shifted reference signal.

10. The phase sensitive voltmeter as claimed in claim 9 including error amplifier means having input and output terminal means, said error amplifier input terminal means operatively connected to said output terminal means of said fourth analog multiplier means, said error amplifier output terminal means operatively connected to said phase shifter means, said error amplifier means generating a signal for controlling said phase shifter means.

11. The phase sensitive voltmeter as claimed in claim 10 wherein said phase shifter means includes:
 a. sine function generator means having input and output terminals, said sine function generator input terminal operatively connected to said error amplifier output terminal means;
 b. cosine function generator means having input and output terminals, said cosine function generator input terminal operatively connected to said error amplifier output terminal means;
 c. fifth analog multiplier means having first and second input terminals and an output terminal, said fifth analog multiplier means first input terminal operatively connected to said output terminal of said sine function generator means, said second input terminal of said fifth analog multipliers operatively connected to said quadrant selector means;
 d. sixth analog multiplier means having first and second input terminals and an output terminal, said sixth analog multiplier means first input terminal operatively connected to said output terminal of said cosine function generator means, said second input terminal of said sixth analog multiplier means operatively connected to said quadrant selector means;
 e. first summing means operatively connected to said output terminals of said fifth and sixth analog multiplier means for adding the signal at said output terminals of each said fifth and sixth analog multiplier means;
 f. second summing means operatively connected to said first summing means and said second input terminal of said sixth analog multiplier means for adding the signals at said first summing means and quadrant selector means.

* * * * *